United States Patent [19]
Lochbrunner et al.

[11] Patent Number: 6,015,339
[45] Date of Patent: Jan. 18, 2000

[54] CLAMPING DEVICE FOR SKINNING GAME

[76] Inventors: Brian T. Lochbrunner, 1219 Ward 3 School Rd.; Tom I. C. P. Lochbrunner, 190 Hwy. 160, both of Winnsboro, La. 71295

[21] Appl. No.: 09/229,515

[22] Filed: Jan. 11, 1999

Related U.S. Application Data

[60] Provisional application No. 60/113,959, Dec. 28, 1998.

[51] Int. Cl.[7] .................................................. A22B 5/16
[52] U.S. Cl. ........................ 452/187; 452/185; 452/189
[58] Field of Search .................................... 452/185, 187, 452/189, 190, 125

[56] References Cited

U.S. PATENT DOCUMENTS

| | | | |
|---|---|---|---|
| 828,620 | 8/1906 | Martin | 294/79 |
| 1,027,335 | 5/1912 | Heyerdahl | 294/79 |
| 2,169,928 | 8/1939 | Saley | 294/79 |
| 3,137,030 | 6/1964 | Varner | 452/187 |
| 3,188,130 | 6/1965 | Pietrowicz . | |
| 3,570,049 | 3/1971 | Muckelrath | 452/187 |
| 4,543,688 | 10/1985 | Barchus | 452/187 |
| 4,615,077 | 10/1986 | Beebe . | |
| 4,625,363 | 12/1986 | Watson | 452/187 |
| 4,782,557 | 11/1988 | Gladney et al. | 452/187 |

Primary Examiner—Willis Little
Attorney, Agent, or Firm—John M. Harrison

[57] ABSTRACT

A clamping device for attachment to a wall, post or other vertical support and securing a game carcass such as a squirrel, in position to facilitate efficient skinning and dressing of the carcass. In a preferred embodiment the clamping device is characterized by an elongated, generally U-shaped clamp bracket terminated by a bracket mount flange on each end to facilitate mounting the clamp bracket to the support. A pair of spaced-apart leg notches and a central neck notch are provided in the upper edge of the clamp bracket for receiving the legs and neck, respectively, of the carcass, which leg notches initially receive the rear legs of the horizontal carcass. A clamp bar is pivotally mounted on the clamp bracket and a coiled latch spring provided on the clamp bar is stretched taut and caused to engage the clamp bracket to secure the clamp bar against the rear legs of the carcass and the carcass in the clamp bracket, as a knife is used to partially skin the carcass. The rear legs of the carcass are then removed from the bracket, the front legs may be secured in the leg notches while the neck is secured in the neck notch, to facilitate skinning the remainder of the carcass.

13 Claims, 3 Drawing Sheets

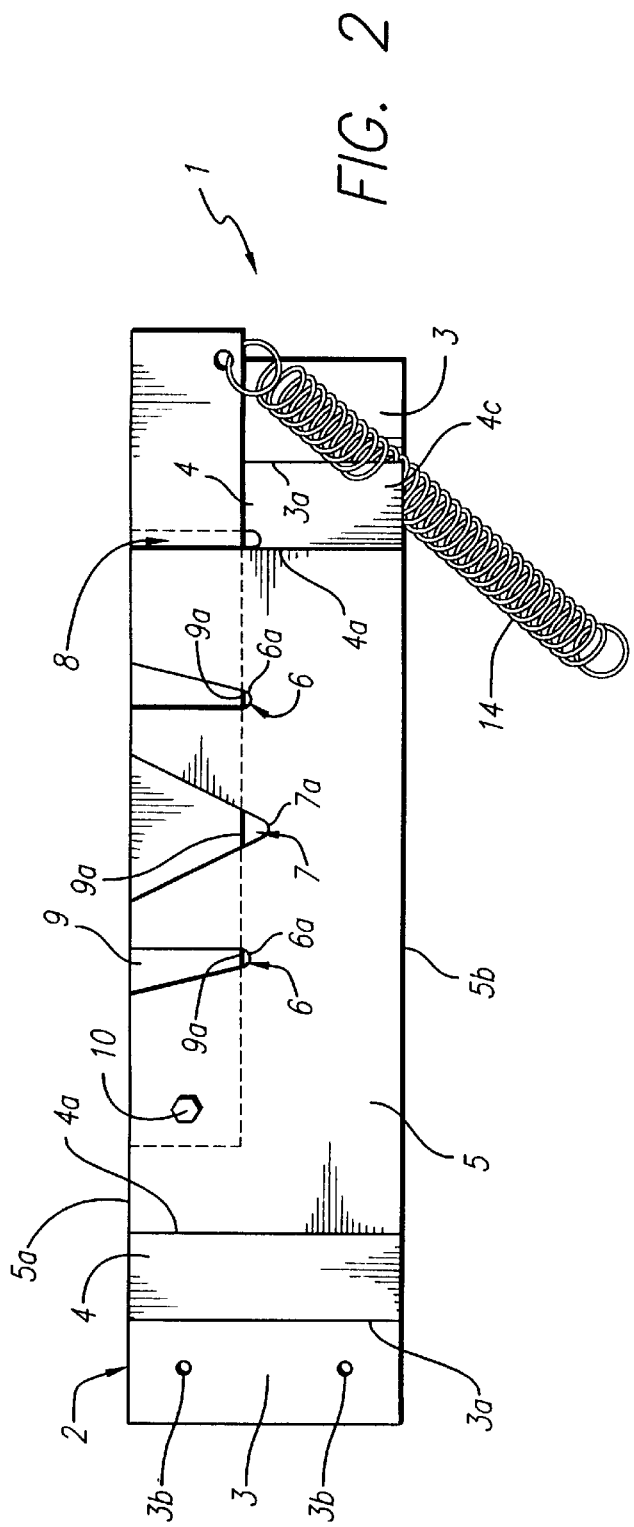
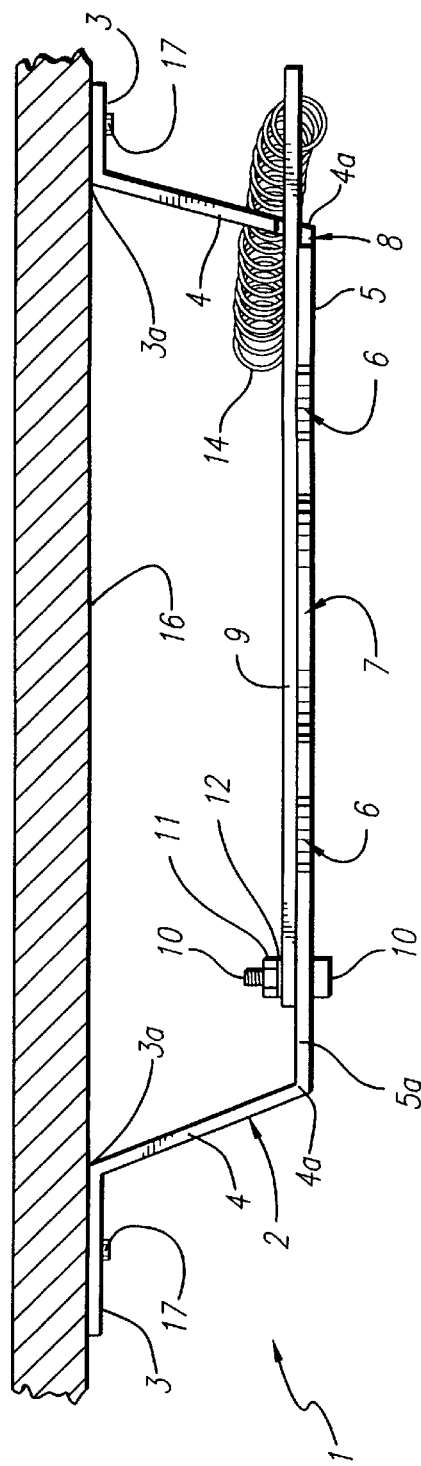
FIG. 2
FIG. 3

CLAMPING DEVICE FOR SKINNING GAME

CROSS-REFERENCE TO RELATED APPLICATIONS

This application claims the benefit of copending U.S. Provisional Application Ser. No. 60/113,959, filed Dec. 28, 1998.

BACKGROUND OF THE INVENTION

1. Field of the Invention

This invention relates to devices for supporting game carcasses in order to better facilitate skinning and dressing the carcasses and more particularly, to a clamping device which is attached to a support wall, post or other vertical support surface for securing a game carcass such as a squirrel carcass in position to facilitate efficient skinning and dressing of the carcass. In a preferred embodiment the clamping device is characterized by an elongated, generally U-shaped clamp bracket terminated on each end by a bracket mount flange to facilitate mounting the clamp bracket to the vertical support. A V-shaped neck notch is provided in the upper edge of the clamp bracket for receiving the neck of the carcass and a leg notch is provided in the clamp bracket on each side of the neck notch for alternately receiving the rear, and optionally, the front legs of the carcass. An elongated clamp bar pivotally mounted on the clamp bracket is lowered to engage the rear legs or front legs and neck of the carcass and a coiled latch spring provided on the clamp bar is stretched taut and caused to engage the clamp bracket and secure the clamp bar against the rear legs or against the neck and/or front legs of the carcass, and the carcass in the clamp bracket. Skinning of the animal carcass is accomplished using the clamping device by initially securing the rear legs of the horizontal carcass in the clamp bracket to skin the lower body and subsequently reversing the carcass and securing the front legs (optionally) and/or the neck in the clamp bracket to complete the skinning operation.

One of the problems realized in the skinning and dressing of small animal carcass such as squirrel, racoons, rabbits, nutria and like animal carcasses is that of supporting and positioning the animal carcass in the proper orientation to achieve efficient skinning and dressing. Since proper execution of the skinning technique requires positioning the animal carcass in a proper configuration to facilitate efficient use of the skinning knife, it is expedient to use a support of proper design in the skinning operation. It is frequently necessary to hang an animal carcass in an elevated, head-down position and sometimes in an elevated, head-up position in order to properly skin and dress the carcass. In both cases the carcass should be supported in a secure manner and the support should allow ample working space to facilitate application of considerable force to the carcass in order to remove the skin and complete the dressing operation.

2. Description of the Prior Art

Various devices for suspending animal carcasses for skinning and dressing game are known in the art. An early invention entitled "Gambrel", is disclosed in U.S. Pat. No. 828,620, dated Aug. 14, 1906, to D. H. Martin. The Martin "Gambrel" is characterized by a pair of hooks, each of which is attached to an elongated scissor device with a separate, curved connector bar used to adjust the spacial relationship of the hooks with respect to each other. A "Suspension Device For Use In Skinning Small Animals" is disclosed in U.S. Pat. No. 1,027,335, dated May 21, 1912, to A. G. Huyerdahl. The Huyerdahl device is characterized by a U-shaped frame, the rear support of which is slidably adjustable to position the parallel, extending ends or fingers closer to or further away from each other, as desired. The fingers extend from the support member in sets of two and the paired fingers in each set are joined by a thumb screw to facilitate securing the legs of an animal therebetween. U.S. Pat. No. 2,169,928, dated Aug. 15, 1939, to H. Saley, entitled "Gambrel", includes a ring, to which are pivotally attached a pair of rods having hooks secured to opposite ends thereof. A spacer bar is removably positioned between the ends of the rod to facilitate support of an animal carcass from the hooks. A "Small Game Hanging Device" is disclosed in U.S. Pat. No. 3,188,130, dated Jun. 8, 1965, to S. P. Pietrowicz. The Pietrowicz device includes a tubular member having a length of cord extending therethrough, with the cord exiting the tubular member at both ends and at the center, in opposite directions. The end of the cord which exits the tubular member in the center is attached to a tree limb or other support, while the legs of the animal are secured in spaced relationship to the two ends of the cord which extend downwardly from the opposite ends of the tubular member. U.S. Pat. No. 4,615,077, dated Oct. 7, 1986, to Jay W. Beebe, describes a "Game Skinning Aid" which is characterized by a shaped wire member configured to define a leg support having an apex bend at the top for securing the game skinning aid to a tree or other support and downwardly-extending, diverging legs which terminate in pointed, forwardly-extending, upturned contact segments. A cooperating head support extends downwardly from points of attachment to the legs and defines a loop at the bottom extension thereof to support the head of an animal. The game skinning aid is designed to alternately support the legs and head of an animal carcass to facilitate efficient skinning and dressing of the animal.

One of the problems which exists in prior art devices used for securing an animal carcass for skinning and cleaning the animal carcass is that of the lack of facility to alternately support both the head and legs of the carcass. This facility is often necessary in order to properly position the carcass to allow more efficient skinning and cleaning of the carcass. Accordingly, it is an object of this invention to provide a clamping device for securing an animal carcass in a position which facilitates efficient cleaning and dressing of the carcass.

Another object of this invention is to provide a clamping device for aid in skinning a game carcass, which clamping device is characterized by a U-shaped clamp bracket for attachment to a vertical support surface and provided with notches for alternately receiving the rear legs and optionally, the front legs as well as the neck of a game carcass to facilitate securing the game carcass to the clamping device in a proper position for efficient skinning, cleaning and dressing of the carcass.

Still another object of this invention is to provide a clamping device for attachment to a vertical support such as a wall, post or barn door and securing a game carcass in position as the carcass is skinned and dressed, which clamping device is characterized by an elongated, generally U-shaped clamp bracket for attachment to the support, a pair of spaced-apart leg notches provided in the clamp bracket for alternately receiving the rear legs and optionally, the front legs, respectively, of the horizontal carcass, a neck notch provided in the clamp bracket typically between the leg notches, for receiving the neck of the carcass and an elongated clamp bar pivotally attached to the clamp bracket and provided with a latch mechanism for securing the clamp bar against the rear legs and, if desired, the front legs, and the neck of the carcass, and the carcass in the clamp bracket as the carcass is skinned and dressed.

Yet another object of this invention is to provide a clamping device for attachment to a vertical support and securing a game carcass in a horizontal skinning and dressing position, which clamping device is characterized by an elongated, generally U-shaped clamp bracket terminated on each end by an attachment flange for attaching the clamp bracket to the support, a pair of spaced-apart, typically V-shaped leg notches provided in the upper edge of the clamp bracket for alternately receiving the rear and front legs of the carcass, a typically V-shaped neck notch provided in the upper edge of the clamp bracket between the leg notches for receiving the neck of the carcass, an elongated, rectangular clamp bar pivotally mounted on the clamp bracket and a coiled latch spring provided on the clamp bar for engaging the clamp bracket and securing the clamp bar against the rear legs or against the neck and front legs (optionally) of the carcass and the carcass in the clamp bracket. In operation of the clamping device, the rear legs of the carcass are initially secured in the respective leg notches of the clamp bracket and the lower body of the carcass skinned, and the rear legs are subsequently removed from the leg notches, the carcass reversed and the front legs (optional) and the neck are secured in the leg and neck notches, respectively, and the upper body of the carcass skinned.

SUMMARY OF THE INVENTION

These and other objects of the invention are provided in a clamping device for attachment to a wall, post, barn door or other vertical support and securing a game carcass such as a squirrel carcass in proper position to facilitate efficient skinning and dressing of the carcass using a knife. In a preferred embodiment the clamping device is characterized by an elongated, generally U-shaped clamp bracket terminated by bracket mount flanges for facilitating attachment of the clamp bracket to the support. A pair of spaced-apart, V-shaped leg notches are provided in the upper edge of the clamp bracket for receiving the rear legs of the carcass and a V-shaped neck notch is provided between the leg notches for receiving the neck of the carcass. An elongated clamp bar, pivotally mounted on the clamp bracket, is provided with a coiled latch spring which is stretched and caused to engage the clamp bracket and alternately secure the clamp bar against the rear legs and neck of the carcass, and the carcass in the clamp bracket, as the carcass is skinned. Skinning of the carcass is accomplished using the clamping device by initially securing the rear legs of the horizontal carcass in the respective leg notches and skinning the lower body of the carcass and then removing the rear legs from the leg notches, reversing the carcass, securing the neck in the neck notch of the clamp bracket and skinning the upper body of the carcass.

BRIEF DESCRIPTION OF THE DRAWINGS

The invention will be better understood by reference to the accompanying drawings, wherein:

FIG. 2 is a front view of the clamping device illustrated in FIG. 1, with the clamp bar component of the clamping device illustrated in functional, clamping configuration;

FIG. 3 is a top view of the clamping device, attached to a support wall;

DESCRIPTION OF THE PREFERRED EMBODIMENTS

Figure 1:
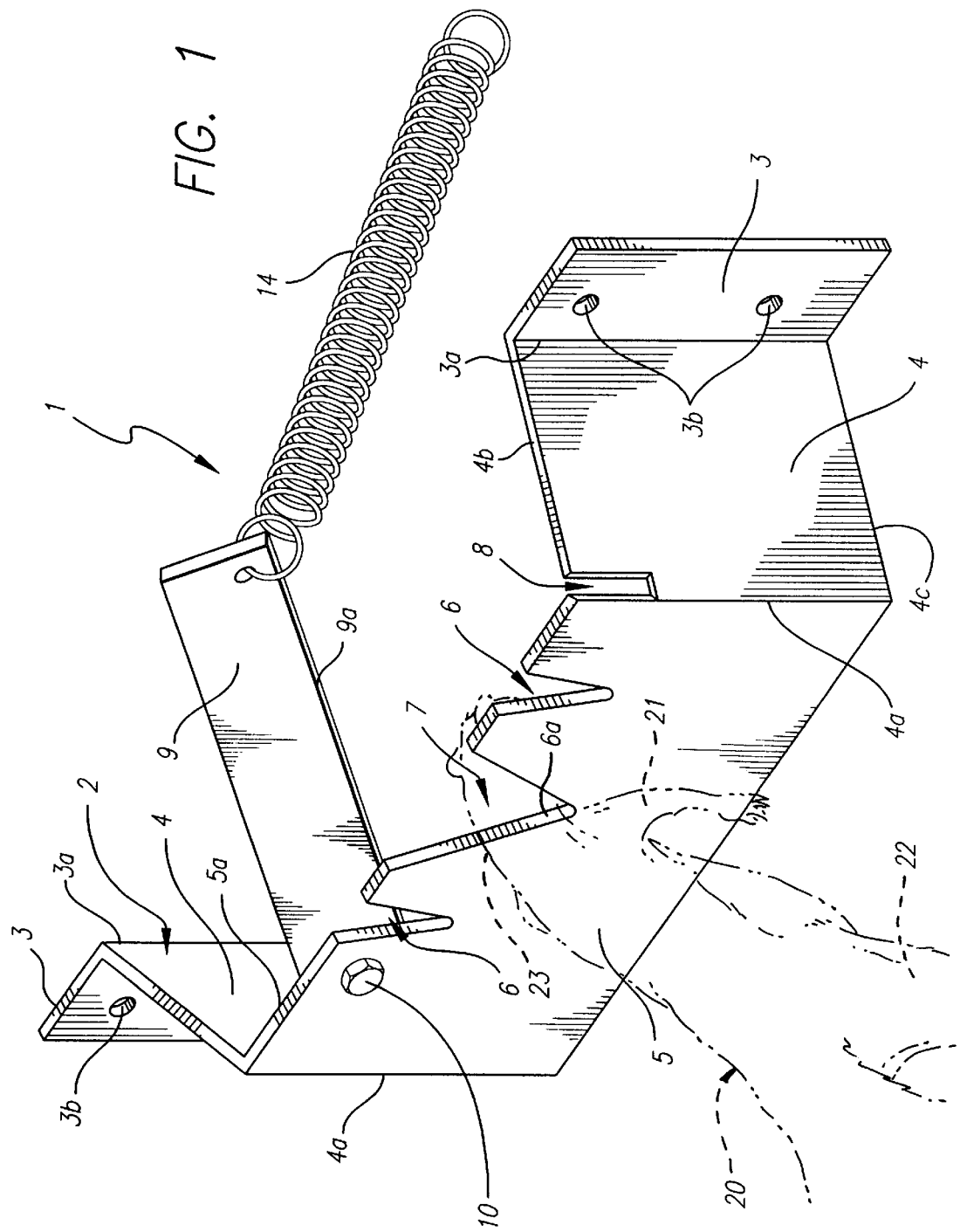
FIG. 1 is a perspective view of a preferred embodiment of the clamping device for aid in skinning game of this invention, with the neck of a game carcass (in phantom) secured in the clamping device.
Figure 4:
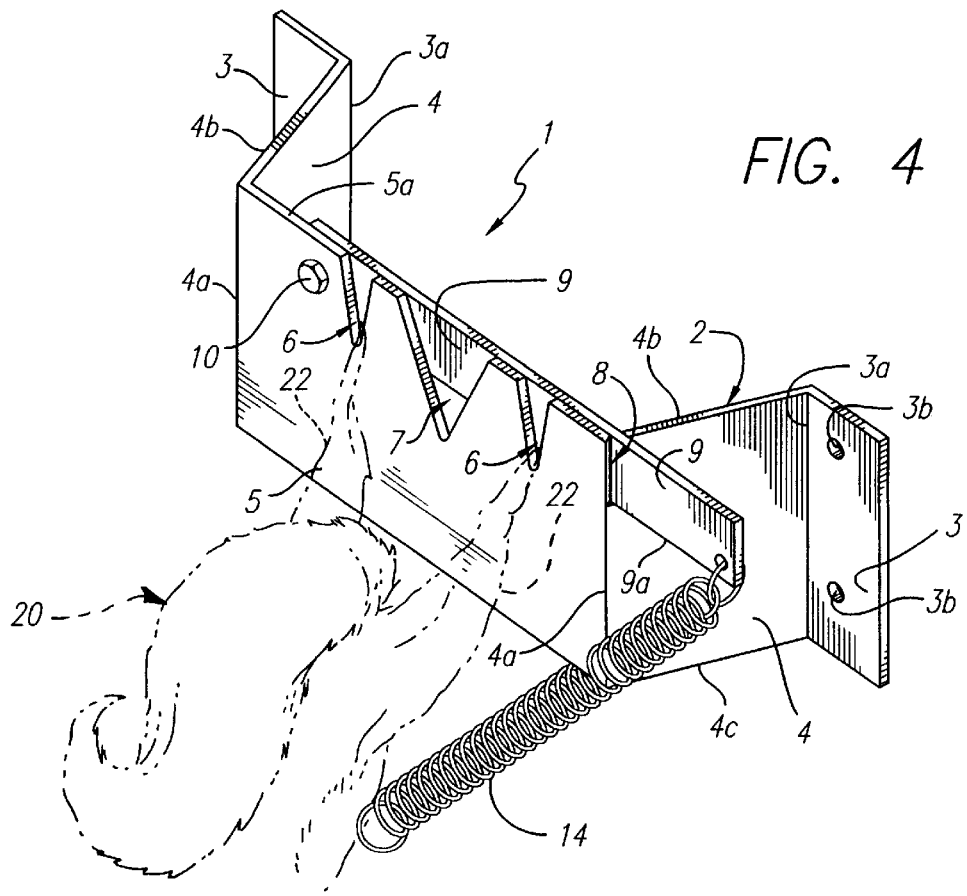
FIG. 4 is a perspective view of the clamping device, with the rear legs of a game carcass (in phantom) secured in the clamping device.
Figure 5:
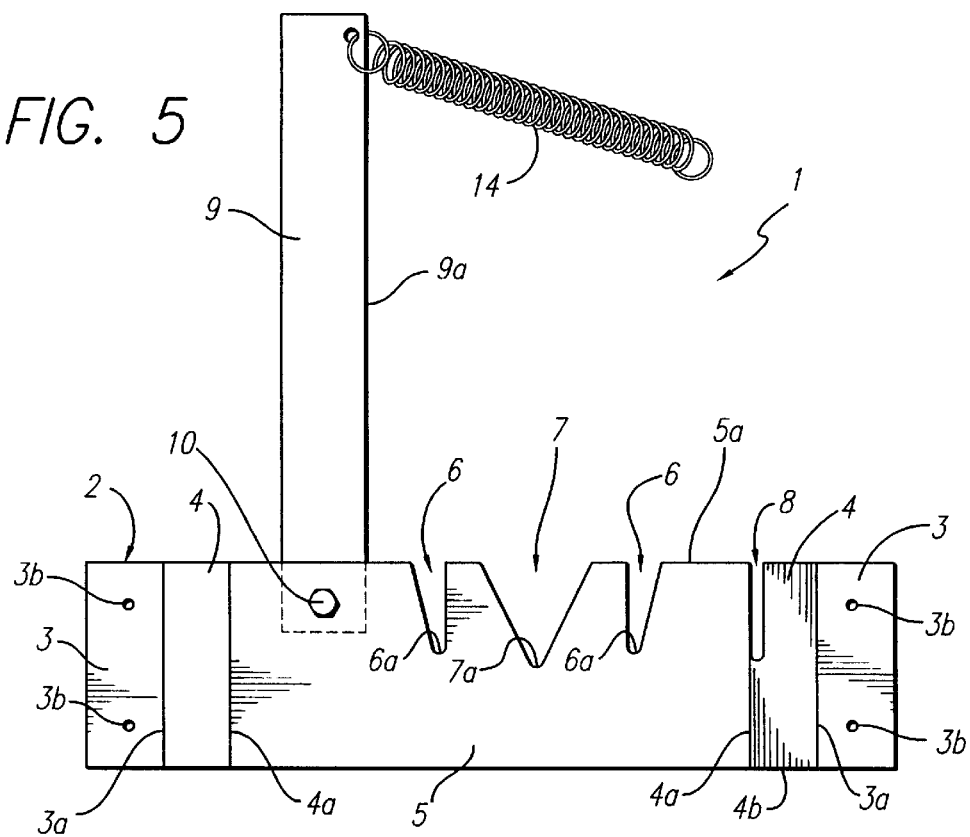
FIG. 5 is a front view of the clamping device with the clamp bar illustrated in raised, non-clamping configuration.

Referring initially to FIGS. 1–5 of the drawings, in a preferred embodiment the clamping device for aid in skinning game, hereinafter referred to as the clamping device, of this invention is generally illustrated by reference numeral 1. The clamping device 1 is characterized by an elongated, generally U-shaped clamp bracket 2, typically shaped from a continuous length of rectangular, hard plastic, steel or aluminum plate. The clamp bracket 2 is terminated on each end by a bracket mount flange 3, each provided with a pair of vertically-spaced screw openings 3b for receiving screws 17 (FIG. 3) which are subsequently threaded into a vertical support surface 16 such as the surface of a wall, post or barn door, for example, as illustrated in FIG. 3 and hereinafter further described. A side bracket segment 4 angles from each bracket mount flange 3 at a flange bend 3a and an elongated front bracket segment 5 is shaped between the side bracket segments 4 at segment bends 4a. A typically V-shaped neck notch 7 is provided in the upper edge 5a of the front bracket segment 5 typically, substantially in the middle thereof, and a typically V-shaped leg notch 6 is further provided in the upper edge 5a of the front bracket segment 5 on each side of the head notch 7, for purposes which will be hereinafter further described. One end of an elongated, rectangular clamp bar 9 is pivotally attached to the inside surface of the front bracket segment 5, typically near the leg notch 6 illustrated on the left in FIGS. 1 and 2, by means of a clamp bar mount bolt 10. The clamp bar mount bolt 10 extends through the front bracket segment 5 and clamp bar 9 and typically receives a washer 12 and a clamp bar mount nut 11, for pivotally securing the clamp bar 9 on the front bracket segment 5, as further illustrated in FIG. 3. The clamp bar 9 can thus be pivoted between the vertical position illustrated in FIG. 5 and the horizontal position illustrated in FIG. 2, in which the clamp bar 9 engages the rear surface of the front bracket segment 5 and rests in a clamp bar notch 8, provided in the top edge 4b of the side bracket segment 4 illustrated on the right in FIGS. 1 and 2, at the segment bend 4a. When the clamp bar 9 is in the horizontal configuration, a clearance is maintained between the bottom or contact edge 9a of the clamp bar 9 and the bottom 7a of the neck notch 7 and the bottom 6a of each of the leg notches 6, as illustrated in FIG. 2. A coiled latch spring 14, attached to the extending, non-attached end of the clamp bar 9, is stretched and then inserted on the bottom edge 4c of the side bracket segment 4, as illustrated in FIG. 2, to secure the clamp bar 9 in the horizontal configuration, as hereinafter further described.

Referring again to FIGS. 1, 3 and 4 of the drawings, in typical application of the clamping device 1 the clamp bracket 2 is initially secured to a vertical support surface 16 such as a wall, post or barn door, for example, by extending screws 17 through the respective screw openings 3b provided in each bracket mount flange 3 and driving the screws 17 into the support surface 16, as illustrated in FIG. 3. The clamp bar 9 is then pivoted from the clamp bar notch 8 to clear the bottom contact edge 9a of the clamp bar 9 from the neck notch 7 and leg notches 6. The rear legs 22 of a small animal carcass such as a squirrel carcass 20 (illustrated in phantom in FIG. 4), are then placed in the respective leg notches 6 provided in the front bracket segment 5, with the squirrel carcass 20 extending forwardly from the clamping device 1. The clamp bar 9 is then lowered to the horizontal configuration illustrated in FIG. 4 and inserted in the clamp bar notch 8 provided in the side bracket segment 4, such that the rear legs 22 of the squirrel carcass 20 are compressed between the bottom contact edge 9a of the clamp bar 9 and the bottom 6a of the respective leg notches 6. The coiled latch spring 14 provided on the clamp bar 9 is then stretched beneath the side bracket segment 4 and inserted on the bottom edge 4c of the side bracket segment 4 to secure the clamp bar 9 against the rear legs 22 of the squirrel carcass 20 and the squirrel carcass 20 in the clamp bracket 2. Accordingly, referring again to FIG. 4, during the skinning operation, the line of force required to remove the skin from the squirrel carcass 20 is away from the clamping device 1. The squirrel carcass 20 can be easily partially skinned and dressed without the necessity of repositioning the squirrel carcass 20, if so desired. However, the clamp bar 9 can be removed from the clamp bar notch 8, the rear legs 22 of the squirrel carcass 20 removed from the respective leg notches 6, the neck 23 secured in the neck notch 7, as illustrated in FIG. 1, with the neck 23 compressed between the clamp bar 9 and the bottom 7a of the neck notch 7. The skin can then be completely removed while the squirrel carcass 20 is in this position, if so desired. Accordingly, it will be appreciated by those skilled in the art that many hunters prefer to skin and dress small animal carcasses by different techniques. For example, Awhile one may prefer to skin and dress a squirrel carcass 20 by securing the squirrel carcass 20 by the rear legs 22 only, another might well prefer to undertake the skinning and dressing operation by securing the neck 23 and/or the front legs 21, while still others may use both techniques. It will be appreciated that the clamping device 1 of this invention facilitates use of either or both techniques by providing the leg notches 6 for typically securing the rear legs 22 of the squirrel carcass 20 in a first operation and the neck notch 7 and leg notches 6 for subsequently securing the neck 23 and/or the front legs 21, respectively, as desired, to complete the skinning and dressing procedure. Still other hunters prefer using at least one securing position more than once in the skinning operation. Under these circumstances, the rear legs 22 of the squirrel carcass 20 are initially secured in the respective leg notches 6 with the back of the squirrel carcass 20 facing upwardly. A sharp knife is then used to partially skin the squirrel carcass 20, beginning at a point just below the tail and extending downwardly about two inches along the squirrel carcass 20. The skin is then pulled down over the head by grasping the loose edge of the hide and pulling it downwardly. The excess hide is then trimmed from around the head, the rear legs 22 of the squirrel carcass 20 are removed from the respective leg notches 6 and the carcass is reversed, as the neck 23 of the squirrel carcass 20 is typically secured in the neck notch 7. The remaining segment of skin on the squirrel carcass 20 is loosened with a knife and the hide is pulled away from the clamping device 1 and over the feet of the squirrel carcass, without removing the feet. The neck 23 of the squirrel 20 is then removed from the respective neck notch 7 and the rear legs 22 are again secured in the leg notches 6 by repeating the procedure noted above. The gutting operation is then completed until dressing of the animal is finished to the satisfaction of the hunter.

It is understood that while the clamping device 1 of this invention is well suited for skinning squirrels, it may also be used to skin and clean other animals such as ducks, rabbits and larger animals such as racoons and nutria, in non-exclusive particular, since the leg notches 6 and neck notch 7 are sufficiently deep to accommodate the legs of various size. Manipulation of the clamp bar 9 into the clamping configuration as described above thus secures the legs and necks of these animals in the clamping device 1.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A clamping device for securing a game carcass for skinning, said clamping device comprising a bracket for receiving the game carcass; a clamp carried by said bracket for engaging the game carcass and securing the game carcass in said bracket; and a latch carried by said clamp for selectively engaging said bracket and securing said clamp on the game carcass.

2. The clamping device of claim 1 comprising at least one aperture provided in said bracket for receiving the game carcass in said bracket.

3. The clamping device of claim 1 wherein said clamp comprises a clamp bar carried by said bracket for clamping the game carcass in said bracket.

4. The clamping device of claim 1 comprising at least one aperture provided in said bracket for receiving the game carcass and wherein said clamp comprises a clamp bar carried by said bracket for clamping the game carcass in said bracket.

5. The clamping device of claim 2 wherein said at least one aperture comprises at least two apertures provided in said bracket for receiving appendages of the game carcass.

6. The clamping device of claim 5 wherein said clamp comprises a clamp bar carried by said bracket for clamping the appendages of the game carcass in said bracket.

7. A clamping device for attachment to a supporting surface and securing a game carcass as the game carcass is skinned, said clamping device comprising a bracket for attachment to the supporting surface; a neck notch provided in said bracket for receiving the neck of the game carcass and a leg notch provided in said bracket on each side of said neck notch for receiving the legs, respectively, of the game carcass; a clamp carried by said bracket for securing the game carcass in said neck notch and said leg notch; and a latch carried by said clamp for selectively engaging said bracket and securing said clamp on the game carcass.

8. The clamping device of claim 7 wherein said clamp comprises a clamp bar pivotally carried by said bracket for engaging the neck and the legs of the game carcass and securing the game carcass in said neck notch and said leg notch, respectively, of bracket.

9. The clamping device of claim 7 comprising a pair of bracket mount flanges provided on said bracket for attaching said bracket to the supporting surface.

10. The clamping device of claim 7 wherein said clamp comprises a clamp bar pivotally carried by said bracket for engaging the neck and the legs of the game carcass and securing the game carcass in said neck notch and said leg notch, respectively, of said bracket and comprising a pair of bracket mount flanges provided on said bracket for attaching said bracket to the supporting surface.

11. A clamping device for attachment to a support wall and securing a squirrel carcass as the squirrel carcass is skinned, said clamping device comprising a clamping bracket having a neck notch for receiving the neck of the squirrel carcass and a leg notch provided on each side of said neck notch for receiving the legs of the squirrel carcass; a clamp bar pivotally carried by said clamping bracket for engaging the legs of the squirrel carcass and securing the squirrel carcass in said neck notch and said leg notch; and latch carried by said clamp bar for engaging said clamping bracket and securing said clamp bar against the squirrel carcass.

12. The clamping device of claim 11 comprising a pair of bracket mount flanges provided on said clamping bracket for securing said clamping bracket to the support wall.

13. The clamping device of claim 12 wherein said latch comprises a coil spring.

* * * * *